(12) United States Patent  
Clarke et al.

(10) Patent No.: US 7,228,207 B2  
(45) Date of Patent: Jun. 5, 2007

(54) METHODS AND SYSTEMS FOR ROUTING MOBILE VEHICLES

(75) Inventors: Michael D. D. Clarke, Irving, TX (US); Barry C. Smith, Flower Mound, TX (US)

(73) Assignee: Sabre Inc., Southlake, TX (US)

( * ) Notice: Subject to any disclaimer, the term of this patent is extended or adjusted under 35 U.S.C. 154(b) by 0 days.

(21) Appl. No.: 10/084,313

(22) Filed: Feb. 28, 2002

(65) Prior Publication Data

US 2003/0167109 A1 Sep. 4, 2003

(51) Int. Cl.  
G06Q 10/00 (2006.01)

(52) U.S. Cl. .................... 701/3; 701/120; 701/202; 705/7; 705/8; 705/9; 718/102

(58) Field of Classification Search ............ 701/3, 701/120, 202, 204, 23, 25, 1, 26, 205, 210; 705/7–9; 718/102; 340/90, 995.26, 825, 340/945, 967, 947, 970, 974, 979; 244/1 R  
See application file for complete search history.

(56) References Cited

U.S. PATENT DOCUMENTS

| 4,943,919 | A | * | 7/1990 | Aslin et al. ............ 364/424.03 |
| 5,265,023 | A | * | 11/1993 | Sokkappa .................... 701/120 |
| 5,270,921 | A | * | 12/1993 | Hornick ......................... 705/6 |
| 5,548,515 | A | * | 8/1996 | Pilley et al. ................. 701/120 |
| 5,657,231 | A | * | 8/1997 | Nobe et al. ............... 364/449.3 |
| 5,659,475 | A | * | 8/1997 | Brown ........................ 701/120 |
| 5,732,384 | A | * | 3/1998 | Ellert et al. ................. 701/120 |
| 5,740,047 | A | * | 4/1998 | Pilley et al. ................. 701/120 |
| 5,867,304 | A | * | 2/1999 | Galvanauskas et al. ...... 359/333 |
| 5,974,355 | A | * | 10/1999 | Matsumoto et al. ......... 701/120 |
| 6,049,754 | A | * | 4/2000 | Beaton et al. ............... 701/204 |
| 6,076,067 | A | * | 6/2000 | Jacobs et al. .................... 705/7 |
| 6,122,572 | A | * | 9/2000 | Yavnai ......................... 701/23 |
| 6,134,500 | A | * | 10/2000 | Tang et al. .................. 701/202 |
| 6,163,744 | A | * | 12/2000 | Onken et al. .................... 701/3 |
| 6,182,005 | B1 | * | 1/2001 | Pilley et al. ................. 701/120 |
| 6,216,109 | B1 | * | 4/2001 | Zweben et al. ................ 705/8 |
| 6,282,487 | B1 | * | 8/2001 | Shiomi et al. .............. 701/120 |
| 6,314,361 | B1 | * | 11/2001 | Yu et al. ..................... 701/120 |
| 6,408,276 | B1 | * | 6/2002 | Yu et al. ......................... 705/7 |

(Continued)

OTHER PUBLICATIONS

Cynthia Barnhart et al., Flight string models for aircraft fleeting and routing, Dec. 1997, pp. 1-21.*

(Continued)

*Primary Examiner*—Cuong Nguyen  
(74) *Attorney, Agent, or Firm*—Alston & Bird LLP (57) ABSTRACT

The present invention relates to methods and systems for routing mobile vehicles under maintenance and operational constraints. In the case of aircraft, the methods and systems may generate an aircraft routing proposal based on information describing a possible flight of an aircraft, determine a proposed flight assignment for the aircraft based on the generated aircraft routing proposal and complying with the information describing the possible flight of the aircraft, and determine whether the proposed flight assignment meets a decision criterion describing requirements for aircraft routing. If the decision criterion is unmet, the methods and systems may optimize the proposed flight assignment such that the proposed flight assignment meets the decision criterion. The methods and systems may also generate a flight assignment plan using the proposed flight assignment that meets the decision criterion.

40 Claims, 4 Drawing Sheets

U.S. PATENT DOCUMENTS

| | | | |
|---|---|---|---|
| 6,415,219 B1* | 7/2002 | Degodyuk | 701/117 |
| 6,542,796 B1* | 4/2003 | Gibbs et al. | 701/3 |
| 6,571,171 B1* | 5/2003 | Pauly | 701/206 |
| 6,580,998 B2* | 6/2003 | Flynn et al. | 701/120 |
| 6,584,400 B2* | 6/2003 | Beardsworth | 701/120 |
| 6,606,553 B2* | 8/2003 | Zobell et al. | 701/120 |
| 6,721,714 B1* | 4/2004 | Baiada et al. | 705/7 |
| 6,789,011 B2* | 9/2004 | Baiada et al. | 701/120 |
| 6,912,461 B2* | 6/2005 | Poreda | 701/120 |
| 7,006,903 B2* | 2/2006 | Smith et al. | 701/3 |
| 7,065,443 B2* | 6/2006 | Flynn et al. | 701/120 |
| 7,120,537 B2* | 10/2006 | Flynn et al. | 701/120 |
| 7,151,995 B2* | 12/2006 | Jasselin | 701/120 |
| 2002/0022984 A1* | 2/2002 | Daniel et al. | 705/8 |
| 2002/0156692 A1* | 10/2002 | Squeglia et al. | 705/26 |
| 2002/0194037 A1* | 12/2002 | Creed et al. | 705/5 |
| 2003/0050746 A1* | 3/2003 | Baiada et al. | 701/3 |
| 2003/0167109 A1* | 9/2003 | Clarke et al. | 701/3 |
| 2004/0073440 A1* | 4/2004 | Garbers et al. | 705/1 |
| 2005/0024189 A1* | 2/2005 | Weber | 340/425.5 |
| 2006/0095175 A1* | 5/2006 | deWaal et al. | 701/33 |
| 2006/0265234 A1* | 11/2006 | Peterkofsky et al. | 705/1 |

OTHER PUBLICATIONS

Song et al., D decision support framework for crew management during airline irregular operations, Operations Research in the Airline industry, pp. 259-286, Kluwer Academic Publishers, 1998, United States—cited by others.*

Wei et al., Optimization model and algorithm for crew management during airline irregular operations, Journal of Combination Optimization 1, pp. 305-321, Kluwer Academic Publishers, 1997, The Netherlands, cited by others.*

Vance et al., Airline crew scheduling: A new formulation and desomposition algorithm, to appear on Operation Research Journal, 1994, pp. 1-32, cited by others.*

Anbil et al., Recent advances in crew-pairing optimization at American Airlines, Interfaces, 1991, v21, pp. 62-74, cited by others.*

Arguello et al., A grasp for aircraft routing in response to groundings and delays, Journal of Combinatorial Optimization 5, pp. 211-228 (1971), the Netherlands, cited by others.*

Dusan Teodorovic et al., Model to reduce airline schedule disturbances, Journal of Transportation Engineering; Jul./Aug. 1995, the United States, cited by others.*

Jarrah et al., A decision support framework for airline flight cancellations and delays, Transportation Science, vol. 27, No. 3, pp. 266-280, Operations Research Society of America (1993), the United States, cited by others.*

Yan et al., A decision support framework for multi-fleet routing and multi-stop flight scheduling, Transportation Research, vol. 30, No. 5, pp. 379-398, Elsevier Science Ltd. (1996), Great Britain, cited by others.*

Bard, J.F. et al., *Improving Through-Flight Schedules*, IEE Transactions, Sep. 1987, pp. 242-251.

Daskin, M.S. et al., *A Lagrangian Relaxation Approach to Assigning Aircraft to Routes in Hub and Spoke Networks*, Transportation Science, vol. 23, No. 2, May 1989, pp. 91-99.

Desaulniers, G. et al., *Daily Aircraft Routing and Scheduling*, Jun. 30, 1994, 33 pages.

Desrochers, M. et al., *A Generalized Permanent Labelling Algorithm for the Shortest Path Problem With Time Windows*, INFOR vol. 26, No. 3, 1988, pp. 190-211.

Kabbani, N. M. et al., *Aircraft Routing at American Airlines*, 1992, pp. 12-27.

Soumis, F. et al., *A Model for Large-Scale Aircraft Routing and Scheduling Problems*, Transpn. Res.-B, vol. 14B, 1980, pp. 191-201.

Talluri, K., *Swapping Applications in a Daily Airline Fleet Assignment*, Transportation Science, vol. 30, No. 3, 1996, pp. 237-248.

Clarke, L. et al., *The Aircraft Rotation Problem*, (Research Paper, Georgia Institute of Technology), 1995, pp. 1-14.

Bradley, S. P. et al., *Linear Programming in Matrix Form* (Appendix B), Applied Mathematical Programming, Addison-Wesley Publishing Company, pp. 675-688.

Bradley, S. P. et al., *Integer Programming*, Applied Mathematical Programming, Addison-Wesley Publishing Company, pp. 386-395.

Bradley, S. P. et al., *Large-Scale Systems*, Applied Mathematical Programming, Addison-Wesley Publishing Company, pp. 540-545.

Dantzig, G. B. et al., *The Decomposition Algorithm for Linear Programs*, Econometrics, vol. 29, No. 4, 1961, pp. 766-779.

Ahuja, R. et al., Network Flows: Theory, Algorithms, and Applications; Prentice-Hall, Inc., 1993; *Dantzig-Wolfe Decomposition, Multicommodity Flows*, Chap. 17, pp. 670-673.

Dantzig, G. B. et al., *Decomposition Principle For Linear Programs*, The Rand Corporation, Santa Monica, CA, 1959, pp. 100-111.

Cynthia Barnhart, Natashia L. Boland, Lloyd W. Clarke, Ellis L. Johnson, George L. Nemhauser, Rajesh G. Shenoi; Flight String Models for Aircraft Fleeting and Routing; Dec. 1997; Abstract page, pp. 1-21.

* cited by examiner

METHODS AND SYSTEMS FOR ROUTING MOBILE VEHICLES

DESCRIPTION OF THE INVENTION

1. Field of the Invention

The present invention relates to methods and systems for routing mobile vehicles under maintenance and operational constraints.

2. Background of the Invention

Traditionally, most airline carriers manually assign routes to aircraft. This usually involves having experts allocate all candidate flight segments to specific aircraft tail numbers (unique sequence of alphanumeric characteristics used to identify a specific aircraft) within a given sub-fleet of the airline. In addition to any requirements of the flight segments, the experts must ensure the allocations meet the operational and maintenance requirements of the aircraft. Considering that some carriers may have hundreds of aircraft and thousands of flights scheduled over a given time period (e.g., a month), this can be a complex and cumbersome process. This problem is not necessarily unique to the airline industry, it applies to carriers of other modes of transportation.

Further, during the normal operations of a carrier, situations may often develop wherein modifications have to be made to the existing schedule plan. For example, an aircraft may unexpectedly be grounded, thus leaving all flights that were assigned to the aircraft's route without an aircraft. Since most carriers would not willingly give up the revenues generated by the flights, experts must re-allocate and shift resources in order to accommodate the orphaned flights. If this happens only on rare occasions, then the traditional manual approach might be acceptable.

In other instances, however, airlines may find it necessary to adjust their flight schedules on a regular basis. For example, passenger demand may require daily adjustments to flight schedules because the demand inherently varies over the course of the week. Manually re-planning the assignments of the aircraft and flights to accommodate these adjustments may be inefficient. Further, given the necessity to produce a plan within short time constraints, a generated plan may not be fully calculated to maximize revenues for the airline.

Therefore, it would be beneficial to develop efficient solution procedures that can determine feasible aircraft routings over a given time period while considering all operational and maintenance constraints. These procedures could be used to make the initial aircraft routing and/or update the routing as necessary.

SUMMARY OF THE INVENTION

Systems and methods consistent with the present invention determine feasible routings of mobile vehicles over a given time period taking into consideration all prescribed maintenance and operational constraints.

One exemplary aspect of the present invention may include a method for routing aircraft. The method may comprise generating an aircraft routing proposal based on information describing a possible flight of an aircraft, determining a proposed flight assignment for the aircraft based on the generated aircraft routing proposal and complying with the information describing the possible flight of the aircraft, and determining whether the proposed flight assignment meets a decision criterion describing requirements for aircraft routing. If the decision criterion is unmet, the method may further include optimizing the proposed flight assignment such that the proposed flight assignment meets the decision criterion. The method may also include generating a flight assignment plan using the proposed flight assignment that meets the decision criterion.

A second exemplary aspect of the present invention may include an aircraft routing system. The system may include means for generating an aircraft routing proposal based on information describing a possible flight of an aircraft, means for determining a proposed flight assignment for the aircraft based on the generated aircraft routing proposal and complying with the information describing the possible flight of the aircraft, means for determining whether the proposed flight assignment meets a decision criterion describing requirements for aircraft routing, means for optimizing the proposed flight assignment such that the proposed flight assignment meets the decision criterion if the decision criterion is unmet, and means for generating a flight assignment plan using the proposed flight assignment that meets the decision criterion.

A third exemplary aspect of the present invention may include a method for generating an aircraft routing proposal. The method may include receiving information describing a possible flight of an aircraft, generating a flight network from the received information, modeling at least one of the maintenance and operational constraints, and determining an aircraft routing proposal for the aircraft that satisfies the received information. The received information may include maintenance and operational constraints.

A fourth exemplary aspect of the present invention may include a system for generating an aircraft routing proposal. The system may include means for receiving information describing a possible flight of an aircraft, means for generating a flight network from the received information, means for modeling at least one of the maintenance and operational constraints, and means for determining an aircraft routing proposal for the aircraft that satisfies the received information. The received information may include maintenance and operational constraints.

A fifth exemplary aspect of the present invention may include a mobile vehicle routing method. The method may comprise generating a vehicle routing proposal based on information describing a possible arc of a vehicle, determining a proposed arc assignment for the vehicle based on the generated vehicle routing proposal and complying with the information describing the possible arc of the vehicle, determining whether the proposed arc assignment meets a decision criterion describing requirements for vehicle routing, optimizing the proposed arc assignment to meet the decision criterion if the decision criterion is unmet, and generating an arc assignment plan using the proposed arc assignment that meets the decision criterion.

Additional aspects of the invention are set forth in the description which follows, and in part are obvious from the description, or may be learned by practice of methods, systems, and articles of manufacturer consistent with features of the present invention. It is understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several aspects of the invention and together with the description, serve to explain the principles of the invention. In the drawings.

DESCRIPTION OF THE EMBODIMENTS

Systems and methods consistent with the present invention determine feasible aircraft routings that satisfy all prescribed maintenance and operational constraints. Such systems and networks can be used to assign all scheduled flights within a given time horizon based on the available aircraft. They may also bridge the gap between strategic planning and operations control (i.e., tactical aircraft routing) by automating the task of implementing the strategic plan during operations control. Further, in performing these functions, systems and methods consistent with the present invention are flexible and may relax violated operational constraints in order to determine feasible tail assignments. Additionally, they may use a defined prioritization scheme to find a feasible solution, if all prescribed operation constraints cannot be satisfied.

Reference is now made in detail to exemplary embodiments of the invention, examples of which are illustrated in the accompanying drawings. Wherever possible, the same reference numbers are used throughout the drawings to refer to the same or like parts.

Figure 1:
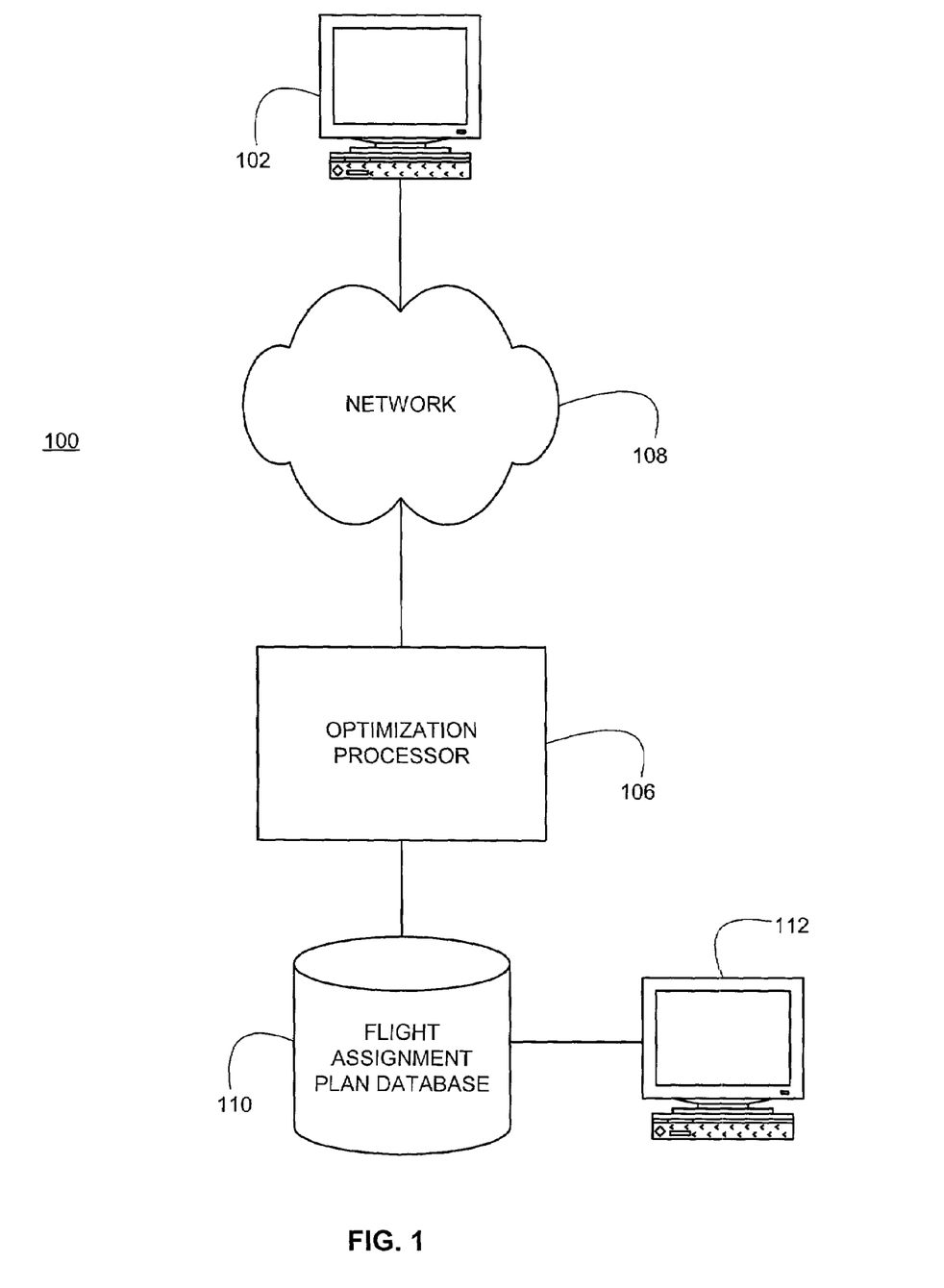
FIG. 1 illustrates an exemplary system, consistent with the present invention, for determining aircraft routings.

FIG. 1 illustrates an exemplary system 100 for aircraft routing in which features and principles of the present invention may be implemented. The aircraft routing system 100 includes a flight management/operations system 102, an optimization processor 106, a network 108 connecting the flight management/operations system 102 and the optimization processor 106, a flight assignment plan database 110, and a flight information display system 112. The processor 106 is coupled to the flight assignment plan database 108. The flight assignment plan database 108 is coupled to a flight information display system 112. While FIG. 1 shows only one computer system 102 providing information to the aircraft routing system 100, the system 100 may receive information from any number of sources (e.g., additional computer systems, reports, etc.).

The flight management/operations system 102 may contain aircraft information, flight information, maintenance information, and passenger information to be used in determining a flight assignment plan. For instance, the flight management/operations system 102 may be the Sabre AirOps, Sabre Flight Operating System, or similar system used by airlines for monitoring and scheduling daily maintenance and flight operations and tracking aircraft position. The flight information may include information describing the scheduled flight, such as flight origin, destination, start time, end time, block time (i.e., length of flying time for flight), booked passenger loads, passenger revenue/fare, assigned aircraft family type, assigned crew rating, minimum equipment list (MEL) restrictions, operating restrictions, aircraft information, maintenance information, and/or other information associated with the flight. The MEL restrictions may further include auxiliary power unit (APU), extended-range twin-engine operations (ETOPS), traffic alert and collision avoidance system (TCAS), and/or other equipment restrictions. The operating restrictions may further include flight range, noise rating of aircraft assigned to the flight, whether the flight will be over water, and/or other restrictions that may affect the desired flight route.

The aircraft information may include tail identification, hourly operating cost, current location, ready time, remaining flight time, passenger capacity, aircraft family type, crew rating, MEL capability, and/or other information associated with the aircraft. The maintenance information may include aircraft tail, type of maintenance check, scheduled location, start time, end time, and/or other information required to properly route aircraft for maintenance.

The network 108 may include a public network such as the Internet or a telephony network, a private network, a virtual private network, or any other mechanism for enabling communication between two or more nodes or locations. The network 108 may include one or more of wired and wireless connections. Wireless communications may include radio transmission via the airwaves, however, those of ordinary skill in the art will appreciate that various other communication techniques can be used to provide wireless transmission including infrared line of sight, cellular, microwave, satellite, Bluetooth packet radio and spread spectrum radio. Wireless data may include, but is not limited to, paging, text messaging, e-mail, Internet access and other specialized data applications specifically excluding, or including voice transmission.

In some instances consistent with the invention, the network 108 may include a courier network (e.g. postal service, United Parcel Service, Federal Express, etc.). Other types of networks that are to be considered within the scope of the invention include local area networks, metropolitan area networks, wide area networks, ad hoc networks, and/or any mechanism for facilitating communication between two nodes or remote locations.

The flight assignment plan database 110 may be used to store a flight assignment plan generated by the optimization processor 106 as described later herein. The database 110 may include storage media, such as magnetic storage devices, optical storage devices, organic storage devices, random access memory, printed media, and/or any other medium for storing information.

The flight information display system 112 may be used to access the stored flight assignment plan in the database 10. The flight information display system 112 may be part of a Sabre airport product suite or any information system used to communicate the most current flight schedule within the airline and at various airport stations in the airline network.

Figure 2:
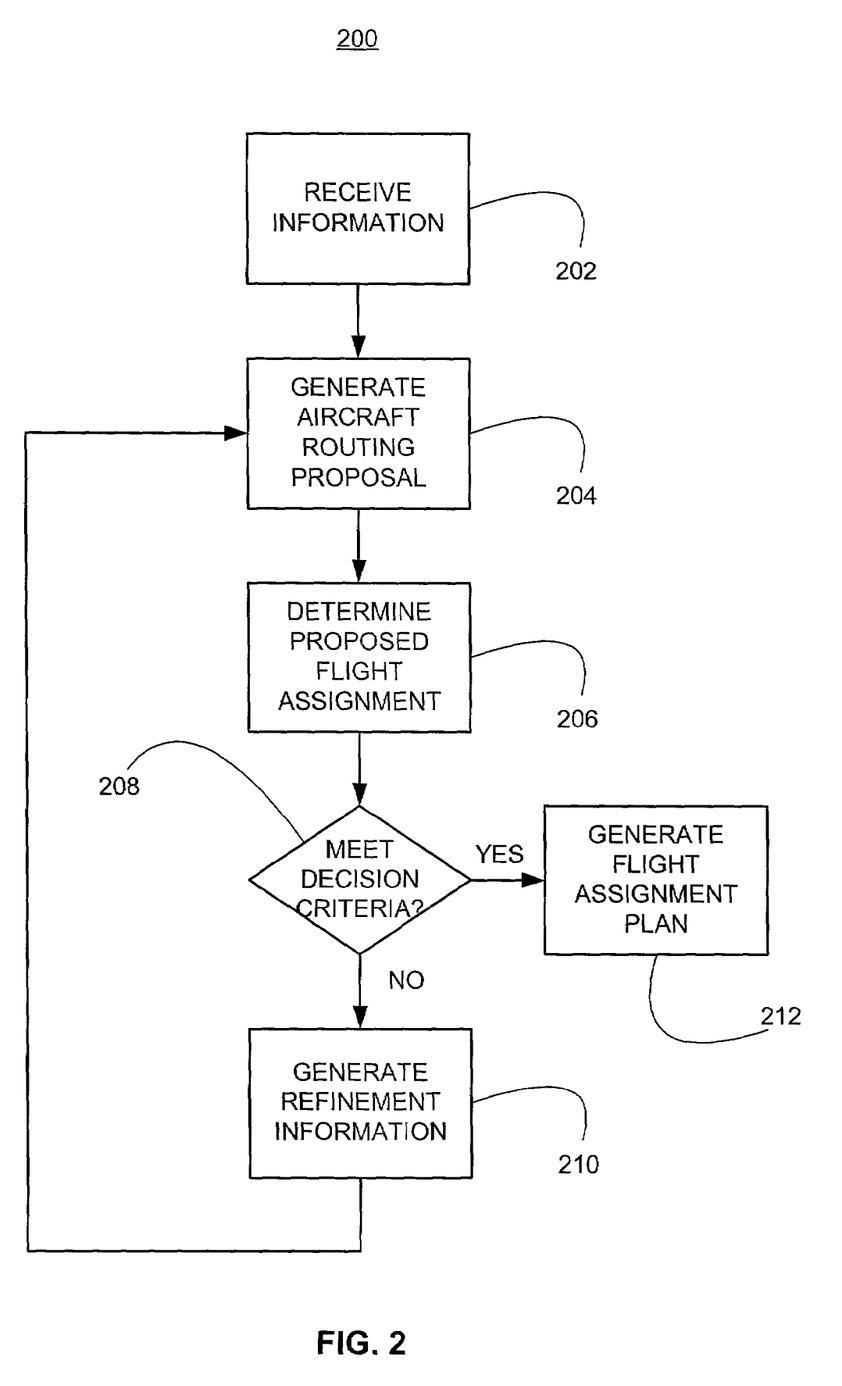
FIG. 2 illustrates a flowchart of an exemplary method, consistent with the present invention, for determining aircraft routings.

The optimization processor 106 may be configured to implement the exemplary aircraft routing method illustrated in flowchart 200 of FIG. 2. Processor 106 may be implemented using any type of computer processor, such as a personal computer, workstation, mainframe, application specific integrated circuit, etc. As shown in FIG. 2, the processor 106 may receive information (flight, aircraft, maintenance, and/or passenger information) from the flight management/operations system 102 via network 108 (step 202). The processor 106 may generate an aircraft routing proposal that satisfies the received information and any constraints contained therein (step 204). In general the routing proposal may describe possible sequences of flights and non-flight events for a given aircraft. To generate the aircraft routing proposal, the processor 106 may organize the received information into a flight network for each aircraft.

For example, as described above the received information may contain flight origin, destination, start time, end time, etc. The processor 106 may organize a flight network by creating data structures in its memory. The data structures may contain, inter alia, location (e.g., airport in Chicago) and time information. The data structures may also contain pointers pointing to other data structures containing different location and/or time information. From the data structures and pointers a map of all flights in an airline schedule may be represented in memory or other storage media.

Figure 3:
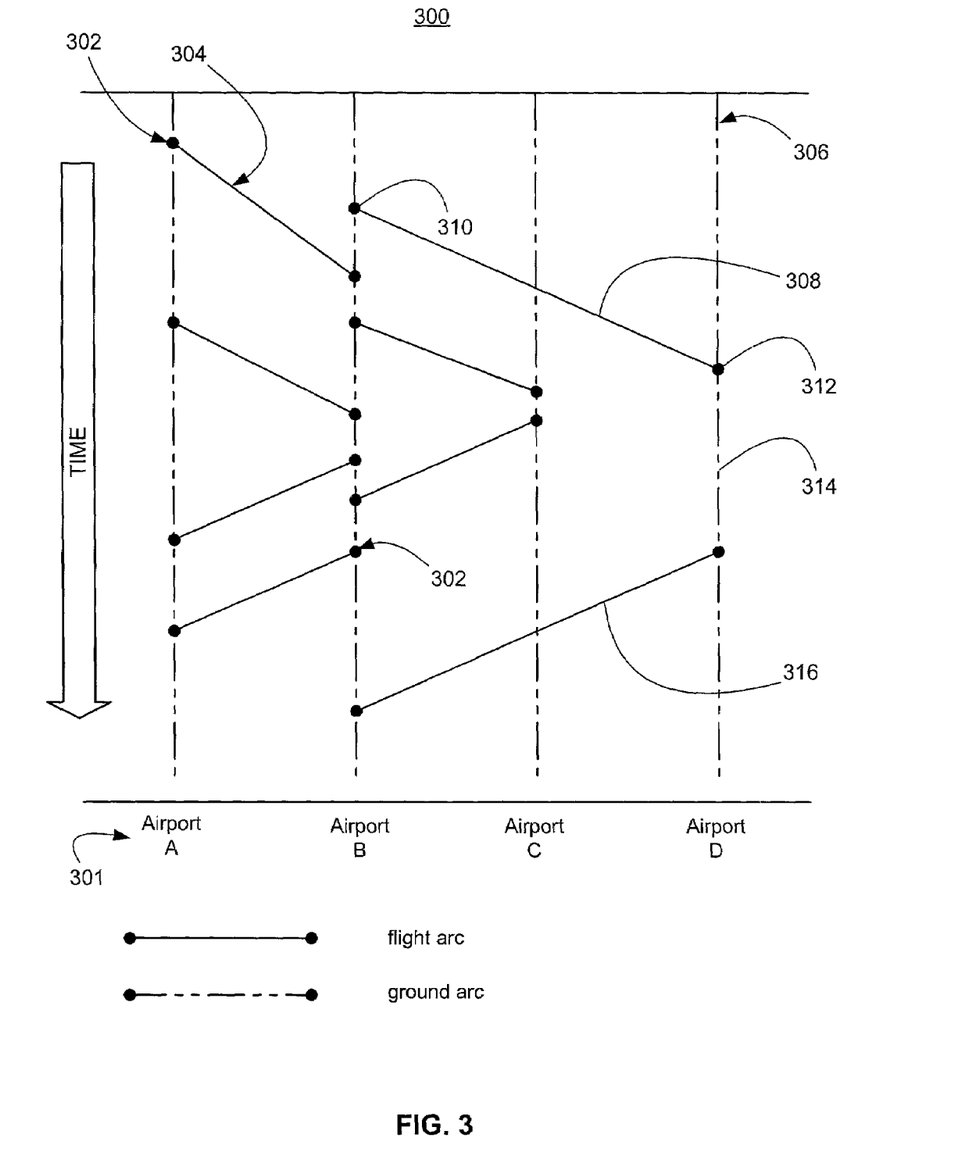
FIG. 3 illustrates an exemplary flight network consistent with the present invention.

FIG. 3 illustrates an exemplary flight network 300. The flight network 300 represents an airline schedule for a particular aircraft and is drawn using vertical timelines. Any such flight network 300 for a particular plane shows all possible flights for that plane meeting maintenance and operational criteria in the received information. The vertical timelines are located over a horizontal space representing given stations, such as airports "A", "B", "C", and "D" 301. Each event (e.g., an arrival or departure) at a given station is represented by a node 302 for a specific time and location coordinate. Flights are represented by "flight arcs" 304 which connect event Nodes 302 at the origin and destination of the flights. "Ground arcs" 306 in the flight network 300 connect chronologically successive pairs of the nodes 302 at a given station. These arcs are necessary in order to describe the flow of aircraft through the flight network 300 and for the application of network flow algorithms, such as shortest-path algorithms. Although the above example makes reference to flight arcs and ground arcs, other types of arcs (etc., water, space, etc.) may also be include.

For example, flight arc 308 from node 310 to node 312 represents a flight in the airline schedule departing from airport "B" and arriving at airport "D". If the aircraft is assigned the route conveying travelers along the flight arc 308, the network 300 shows the aircraft may also stay at airport "D" for maintenance or refueling during ground arc 314, and then convey travelers along flight arc 316.

Processor 106 may model all maintenance and operational constraints as reflected in the received information in each individual aircraft's flight network thereby enabling tail specific constraints to be considered during the allocation process. The processor 106 may treat each flight network as a sub-problem to be solved as part of a Dantzig-Wolfe decomposition (i.e., a column generation algorithm).

The Dantzig-Wolfe decomposition is described by George B. Dantzig and Philip Wolfe in "Decomposition Principle for Linear Programs", Rand Corporation, Santa Monica, Calif., Nov. 24, 1959, pp. 101–111 and in "Econometrics", Vol. 29, No. 4, October 1961, pp. 767–778; Stephen Bradley, Arnoldo Hax, and Thomas Magnanti in "Applied Mathematical Programming", Addison-Wesley Publishing Company, Reading, Mass., 1977, pp. 540–545; and Ravindra Ahuja, Thomas Magnanti, and James Orlin in "Network Flows: Theory, Algorithms, and Applications", Prentice-Hall, Inc., Englewood Cliffs, N.J., 1993, pp. 671–673, all of which are incorporated herein by reference in their entirety.

For example, the flight network 300 of each aircraft may be organized to represent an exemplary sub-problem with Equations SP1 and CSP1 to CSP9 shown below, wherein the variables are defined in Table 1.

$$\text{Minimize} \sum_{f \in F} \{AOC_{af} - \text{flightdual}_f\} \times Assign_{af} - \quad (SP1)$$

$$\text{aircraftdual}_a \quad \forall a \in A$$

Subject to:

$$\sum_{f \in F(s|in, t)} Assign_{af} -$$

$$\sum_{f \in F(s|out, t)} Assign_{af} + \sum_{\substack{m \in \\ MA(s|v=start)}} Main\_A_{ast} -$$

$$\sum_{\substack{m \in \\ MA(s|v=end)}} Main\_A_{ast} + \sum_{\substack{m \in \\ MB(s|v=start)}} Main\_B_{ast} -$$

$$\sum_{\substack{m \in \\ MB(s|v=end)}} Main\_B_{ast} + \gamma_{ast-1} - \gamma_{ast} + Aircln_{ast} = 0$$

$$\forall a \in A, s \in S, t \in T(s) \quad (CSP1)$$

$$Assign_{af} \leq \begin{cases} 1 & \text{if } range_a \geq SL_f, apu_a \geq apu_f, noise_a \geq noise_f \\ & etops_a \geq etops_f, H20_a \geq H20_f, tcas_a \geq tcas_f \\ 0 & \text{otherwise} \end{cases}$$

$$\forall a \in A, f \in F \quad (CSP2)$$

$$\text{swap\_within\_type} \times Assign_{af} \leq \begin{cases} 1 & \text{if } type_a = ac\_type_f \\ 0 & \text{otherwise} \end{cases}$$

$$\forall a \in A, f \in F \quad (CSP3)$$

$$\text{swap\_within\_crew} \times Assign_{af} \leq$$

$$\begin{cases} 1 & \text{if } crewtype_a = crewtype_f \\ 0 & \text{otherwise} \end{cases}$$

$$\forall a \in A, f \in F \quad (CSP4)$$

$$\text{swap\_within\_family} \times Assign_{af} \leq$$

$$\begin{cases} 1 & \text{if } family_a = ac\_family_f \\ 0 & \text{otherwise} \end{cases}$$

$$\forall a \in A, f \in F \quad (CSP5)$$

$$\sum_{f \in F|dt>t1, at<t2} BlockTime_f \times Assign_{af} \leq$$

$$\begin{cases} FlyingTime_a & \text{if } t1 = CT_a \\ MaintenanceInterval & \text{otherwise} \end{cases}$$

$$\forall a \in A, t1 \in T(a), t2 \in T(a) \mid Fly\_A\_Check[a, t1, t2] = 1 \quad (CSP6)$$

$$\sum_{f \in F|dt>t1, at<t2} Assign_{af} \leq \begin{cases} FlyingCycles_a & \text{if } t1 = CT_a \\ MaintenanceCycle & \text{otherwise} \end{cases}$$

$$\forall a \in A, t1 \in T(a), t2 \in T(a) | Fly\_B\_Check[a,t1,t2]=1 \quad (CSP7)$$

$$Main\_A_{ast1}=1 \forall m \in MA, a \in A, s \in S, t \in T(s|t1, m) \quad (CSP8)$$

$$Main\_B_{ast1}=1 \forall m \in MB, a \in A, s \in S, t \in T(s|t1, m) \quad (CSP9)$$

where:

Equation CSP1 is a flow balance constraint for each node in the time-space network. Equation CSP2 restricts aircraft assignment based on minimum equipment list (MEL) violations (e.g., APU, ETOPS, TCAS) and operating restrictions (e.g., range, noise rating, over water). In solving the sub-problem, it may be desired to allow similar aircraft of similar type, with similar crews, or in similar families to be interchangeable, so Equations CSP3 to CSP5 restrict aircraft assignment based on the desired swapping criterion during the allocation process (within aircraft type, crew, or aircraft family). Equation CSP6 ensures that the flying time (sum of block times along a routing) assigned to a given aircraft does not exceed the remaining time between scheduled maintenance checks. Equation CSP7 ensures that the number of cycles on an aircraft does not exceed the limit between maintenance checks. Equation CSP8 ensures that all scheduled A maintenance checks occur. Equation CSP9 ensures that all scheduled B maintenance checks occur. Additional constraint equations to ensure other scheduled maintenance checks occur may be added to the sub-problem.

TABLE I

| Variable | Definition |
| --- | --- |
| $\gamma$ | set of ground arcs |
| $\gamma_{ast}$ | specifies whether aircraft 'a' is at station 's' at time 't' |
| $\gamma_{ast-1}$ | specifies whether aircraft 'a' is at station 's' at time 't-1' |
| A | set of aircraft |
| $ac\_type_f$ | specifies the aircraft type required for a flight 'f' |
| $ac\_family_f$ | specifies the aircraft family required for a flight 'f' |
| $Aircln_{ast}$ | 1 if aircraft 'a' is available at station 's' at time 't' |
| $aircraftdual_a$ | dual value of aircraft 'a' constraint in the restricted master problem (MP1) described later |
| $AOC_{af}$ | operating cost for aircraft 'a' assigned to flight 'f' |
| $apu_a$ | specifies whether an aircraft 'a' has an operational APU unit |
| $apu_f$ | specifies whether a flight 'f' (based on its departure or arrival airport/station) requires APU operations |
| $Assign_{af}$ | 1 if aircraft 'a' is assigned to flight 'f', 0 otherwise |
| at | arrival time for flight 'f' |
| $BlockTime_f$ | scheduled block time for flight 'f' |
| $crewtype_a$ | crew rating for a given aircraft 'a' |
| $crewtype_f$ | crew rating for a given flight 'f' |
| $CT_a$ | current available time for a given aircraft 'a' |
| dt | departure time for a flight 'f' |
| $etops_a$ | specifies whether an aircraft 'a' is capable of ETOPS |
| $etops_f$ | specifies whether a flight requires ETOPS operations |
| F | set of flights |
| F(s) | subset of flights at station 's' |
| F(s | in, t) | subset of flights arriving at station 's' at time 't' |
| F(s | out, t) | subset of flights departing from station 's' at time 't' |
| $family_a$ | aircraft family for aircraft 'a' |
| $flightdual_f$ | dual value of flight 'f' covering constraint in the restricted master problem (MP2) described later |
| Fly_A_Check[a,t1,t2] | 1 if aircraft 'a' is available (out of A check) between time 't1' and time 't2', |
| Fly_B_Check[a,t1,t2] | 1 if aircraft 'a' is available (out of B check) between time 't1' and time 't2' |
| $FlyingCycles_a$ | remaining number of cycles on aircraft 'a' before first scheduled B maintenance check |
| $FlyingTime_a$ | remaining flying time on aircraft 'a' before first scheduled A maintenance check |
| $H2O_a$ | specifies whether aircraft 'a' can fly over water (H20) |
| $H2O_f$ | specifies whether flight 'f' requires an aircraft with over water capability |
| MA | set of scheduled maintenance A checks |
| MA(s) | set of scheduled maintenance A checks at station 's' |
| MA(s | t = end) | set of scheduled maintenance A checks at station 's' that end at time 't' |
| MA(s | t = start) | set of scheduled maintenance A checks at station 's' that start at time 't' |
| $Main\_A_{ast}$ | 1 if there is a scheduled A maintenance for aircraft 'a' at station 's', time 't', 0 otherwise |
| $Main\_B_{ast}$ | 1 if there is a scheduled B maintenance for aircraft 'a' at station 's', time 't', 0 otherwise |
| Maintenance Cycle | maximum number of cycles between B checks |
| MaintenanceInterval | maximum flying time between A checks |
| MB | set of scheduled maintenance B checks |
| MB(s) | set of scheduled maintenance B checks at station 's' |
| MB(s | t = end) | set of scheduled maintenance B checks at station 's' that end at time 't' |
| MB(s | t = start) | set of scheduled maintenance B checks at station 's' that start at time 't' |
| $noise_a$ | noise rating for aircraft 'a' |
| $noise_f$ | noise rating for flight 'f' |
| $range_a$ | operating range for aircraft 'a' |
| S | set of stations |
| $SL_f$ | stage length for flight 'f' (distance in nautical miles) |
| swap_within_crew | 1 if assignment will be done within crew compatible aircraft |
| swap_within_family | 1 if assignment will be done within aircraft family |
| swap_within_type | 1 if assignment will be done within a specific aircraft type |
| T(a) | set of time events for aircraft 'a' |

TABLE I-continued

| Variable | Definition |
| --- | --- |
| T(s) | set of time events at station 's' |
| T(s \| t, m) | subset of times at station 's' for maintenance event |
| tcas$_a$ | specifies whether the TCAS equipment is working on aircraft 'a' |
| tcas$_f$ | specifies whether the TCAS equipment is required for flight 'f' |
| type$_a$ | equipment type for aircraft 'a' |

The processor 106 may solve the sub-problem above using a shortest path algorithm, such as a generalized permanent labeling (GPL) algorithm. According to the GPL algorithm, the processor 106 assigns multiple labels representing cost and time constraints to each node of the network 300. "Labels" are constructs by which the GPL algorithm can keep track of and account for intermediate paths in the flight network 300 as the algorithm attempts to find the shortest path under the sub-problem constraints (Equations CSP1–CSP9). The processor 106 dynamically uses these labels to calculate the labels of other nodes. The labels are calculated to satisfy all side constraints on the problem, such as a maximum cumulative travel time on the aircraft routing or any of the other constraints in Equations CSP1 to CSP9. The processor 106 stores at each node multiple labels of time and cost, until a less costly and/or less travel time flight-sequence that arrives at the given node is found.

At any given node, a new label dominates an existing label if both its time and cost parameters are better than the "best" label determined so far. The processor 106 dynamically manages the set of labels stored at each node in such a way that unnecessary or "dominated" labels are deleted from a linked list at each node, and the label list is sorted in decreasing cost order. Each label corresponds to a different path through the network from the source to the given node, and is classified as being efficient. An efficient path is defined as one such that all of its labels are efficient, and such paths are used to determine the constrained shortest path from source (origin) to sink (destination) in the network. The constrained shortest path of flights for each aircraft represents an aicraft routing proposal for the respective aircraft.

In determining the shortest path, the processor 106 may use other algorithms besides the generalized permanent labeling algorithm. For example the processor 106 may instead use LP-based shortest path algorithm, K-shortest path algorithm, Dijkstra algorithm, and/or any other algorithm compatible with the present invention.

From the aircraft routing proposal, the processor 106 may determine proposed flight assignments (step 206). The proposed flight assignments represent the best attempt so far by the processor 106 in assigning aircraft to flights based on the received information from step 202 and constraints of the flight assignment problem (restricted master problem described below). More particularly, the processor 106 uses the received information to create proposed flight assignments for each aircraft, which may include a sequence of flights and/or ground arcs (i.e., routes) satisfying operational and maintenance constraints. The proposed flight assignments are generated to meet a decision criteria, such as maximizing net revenue and/or some other criteria.

In determining the proposed flight assignments (step 206), the processor 106 may organize the aircraft routing proposal and any other required constraints in the received information into a flight assignment problem (restricted master problem). For example, the aircraft routing proposal determined at step 204 is represented by the variable ASSIGN$_{arf}$ for all flights 'f' covered by routing 'r' assigned to aircraft 'a'. The processor 106 organizes the values of ASSIGN$_{arf}$ into the restricted master problem by using them as coefficients in Equation MP2 of the restricted master problem.

A simplex method, revised simplex method, or any other method compatible with the invention may be used to determine the proposed flight assignments based on the aircraft routing proposal generated by the sub-problem. For example, the processor 106 may create the restricted master problem comprising Equations OF1 and MP1–MP3 shown below, wherein the variables are defined in Table 2. The objective function (Equation OF1) maximizes the net revenue across the entire fleet. Equation MP1 ensures that the flow for each aircraft does not exceed one. Equation MP2 ensures that each scheduled flight is covered once across the entire fleet. Equation MP3 ensures that each aircraft is assigned to at most one routing.

$$\text{Maximize} \sum_{a \in A} \sum_{r \in R(a)} ANR_{ar} \times Route_{ar} \quad (OF1)$$

Subject to:

$$\text{Flow} \sum_{r \in R(a)} FLOW_{ar} \times ROUTE_{ar} - \text{Excess} = 1 \ \forall \ a \in A \quad (MP1)$$

$$\text{Flight Cover} \sum_{a \in A} \sum_{r \in R(a)} ASSIGN_{arf} \times Route_{ar} + Openflying_f = 1 \ \forall \ f \in F$$

$$(MP2)$$

$$\text{Convexity} \sum_{r \in R(a)} Route_{ar} = 1 \ \forall \ a \in A \quad (MP3)$$

TABLE 2

| Variable | Definition |
| --- | --- |
| R(a) | set of maintenance feasible routing for aircraft 'a' |
| ANR$_{ar}$ | net revenue for assigning aircraft 'a' to routing 'r' |
| ASSIGN$_{arf}$ | 1 if flight 'f' is covered by routing 'r' that is assigned to aircraft 'a', 0 otherwise |
| FLOW$_{ar}$ | 1 if routing 'r' is a feasible candidate for aircraft 'a' |
| Route$_{ar}$ | 1 if aircraft 'a' is assigned to routing 'r', 0 otherwise |
| Openflying$_f$ | 1 if flight 'f' is not covered, 0 otherwise |
| Excess | slack variable |

As one of ordinary skill in the art will appreciate, the processor 106 may determine proposed flight assignments using a revised simplex method as described on pp. 675–686 by Stephen P. Bradley, Arnoldo C. Hax, and Thomas L. Magnanti cited above, which is incorporated herein by reference in its entirety.

Returning to FIG. 2, if the proposed flight assignments do not meet a decision criteria (step 208), then the processor 106 may generate additional aircraft routing proposals. The decision criteria in the present example may maximize net revenues when assigning aircraft to flights over an airline's entire flight schedule. The processor 106 addresses this decision criteria in the objective function (Equation OF1) of the restricted master problem. As one of ordinary skill in the art will appreciate, when applying an algorithm, such as the revised simplex method, to solve the restricted master problem, the dual variables of the model constraints are used to indicate whether the objective function has been maximized. In this example, the objective function expresses the total net revenue for assigning all the given aircraft to the scheduled flights. In another example, other decision criteria, such as efficiency, gross revenue, etc., may be selected by a user for optimization instead.

The additional aircraft routing proposals may be generated by first generating refinement information used by the sub-problems to determine additional proposed routings for the aircraft (step 210). The refinement information may be dual variables found by the revised simplex procedure at step 206. From the dual variables, the processor 106 may update the underlying structure of the sub-problem for each aircraft. For example, aircraftdual$_a$ and flightdual$_f$ in Equation SP1 are dual variables used to adjust the costs on each corresponding flight arc in each aircraft's flight network. The aircraftdual$_a$ variable is determined from the aircraft flow constraint (MP1) and aircraft convexity constraint (MP3) in the restricted master problem. The flightdual$_f$ variable is determined from the flight covering constraint (MP2) in the restricted master problem.

After generating the refinement information at step 210, the processor 106 returns to step 204 to generate an additional aircraft routing proposal based on the generated refinement information. The processor 106 may determine additional proposed routings for the aircraft back at step 204 by solving the updated sub-problem using a generalized permanent labeling algorithm or any algorithm previously described. The processor 106 uses the additional proposed aircraft routing to update the restricted master problem via column generation in Dantzig-Wolfe decomposition.

More particularly, during the column generation process, the dual variables (i.e., multipliers) are used to price out the non-basic variables (i.e., columns) by considering their reduced costs. The dual variables ensure that the reduced cost for every variable in the basis is zero. If any reduced cost is of the wrong sign in the restricted master problem, the process will introduce the corresponding non-basic variable into the basis in place of one of the current basic variables, and recompute the simplex multipliers (i.e., dual variables). In order to use column generation in the Dantzig-Wolfe method, the columns need to have structural characteristics which allow the pricing out of operations without explicitly considering every possible column in the problem.

The revised simplex procedure attempts to check if all reduced cost of variables are non-negative for optimality, such that the following equation is satisfied:

$$\text{Min} \sum_{f \in P} \{AOC_{af} - flightdual_f\} \geq aircraftdual_a,$$

wherein P is the set of flights forming the shortest-path flight sequence. The left hand side of this expression is the length of the constrained shortest path connecting the source and sink nodes of aircraft a with respect to the modified costs ($AOC_{af}$-flightdual$_f$). If for all aircraft a, the length of the constrained shortest path for that commodity is at least as large as its corresponding dual variable aircraftdual$_a$, the procedure will satisfy the complementary slackness conditions, and the solution will be optimal. Otherwise, based on the constrained shortest path on the updated network, the reduced cost of the column (i.e., path) is less than the length aircraftdual$_a$ for a given aircraft a. By inserting this column into the basis to create an updated master problem, there will be an improvement to the objective function (Equation OF1) of the restricted master problem.

Using the updated master problem, the processor 106 determines revised flight assignments (step 206). If the processor 106 determines at step 208 that the revised flight assignments do not meet the decision criteria, then the processor 106 repeats steps 204 to 210 until it determines a flight assignment proposal and corresponding aircraft routing proposal that meets the decision criteria. Once the decision criteria is met, no more additional proposed routings for the aircraft under operational and maintenance constraints may be determined and vice versa.

The processor 106 determines a flight assignment plan from the final flight assignment proposal that meets the decision criteria (step 212). Since the Dantzig-Wolfe decomposition and revised simplex method operate with real numbers, the final flight assignment proposal may contain fractional numbers that are not applicable to the real world. For example, the flight assignment process may propose assigning one-half of an aircraft to a route because the mathematics of the problem dictates this meets the decision criteria. However, half an aircraft can not be assigned in the real world. Therefore, at step 212, the processor 106 uses the final flight assignment proposal to solve the master problem to integrality (i.e., solve the master problem such that only whole aircraft are assigned to routes), of which the solution contains the flight assignment plan. As one of ordinary skill in the art will appreciate, this may be done using the branch and bound method described on pp. 387–395 by Stephen P. Bradley, Amoldo C. Hax, and Thomas L. Magnanti cited above and is incorporated herein by reference in its entirety.

Once the processor 106 generates the flight assignment plan, it may store the plan in the flight assignment plan database 110. The plan may be accessed by others, such as the flight information display system 112. All operational departments within the airline will have access to the schedule plan via the flight information display system 112, in order to make resource management decisions such as gate assignment, and man-power staffing.

If for any reason the flight assignment plan needs to be modified, the information (flight, aircraft, maintenance, passenger, etc.) contained in the flight management/operations computer 102 may be modified and a new flight assignment plan may be generated as described above.

With regard to the aircraft routing system 100, it is understood that one of ordinary skill in the art may implement features and principles of the present invention with alternative systems. Alternative systems may comprise one or more processors for implementing the exemplary method illustrated in the flowchart 200 of FIG. 2.

Further, in receiving flight information as part of processing step 202, the functions of the alternative systems may include accessing/obtaining data from a database, data structure, storage medium, survey, and/or any other mechanism or combination of mechanisms. The received data may be raw data, such as data entries from a database, preprocessed data, such as encoded raw data, or any other form of data. "Receiving" data may include at least one of acquisition via a network, via verbal communication, via electronic transmission, via telephone transmission, in hard-copy form, or through any other mechanism enabling reception. In addition, "receiving" may occur either directly or indirectly. For example, receipt may occur through a third party acting on another party's behalf, as an agent of another, or in concert with another. Regardless, all such indirect and direct actions are intended to be covered by the term "receiving" as used herein.

Received data may take one of many exemplary forms. It may simply be a checked box, clicked button, submitted form, or oral affirmation. Or it might be typed or handwritten textual data. Receiving may occur through an on-line form, e-mail, facsimile, telephone, interactive voice response system, or file transfer protocol transmitted electronically over a network at a web site, an internet protocol address, or a network account. Receipt may occur physically such as in hard copy form, via mail delivery, or other courier delivery. "Receiving" may involve receipt directly or indirectly through one or more networks and/or storage media previously described.

Figure 4:
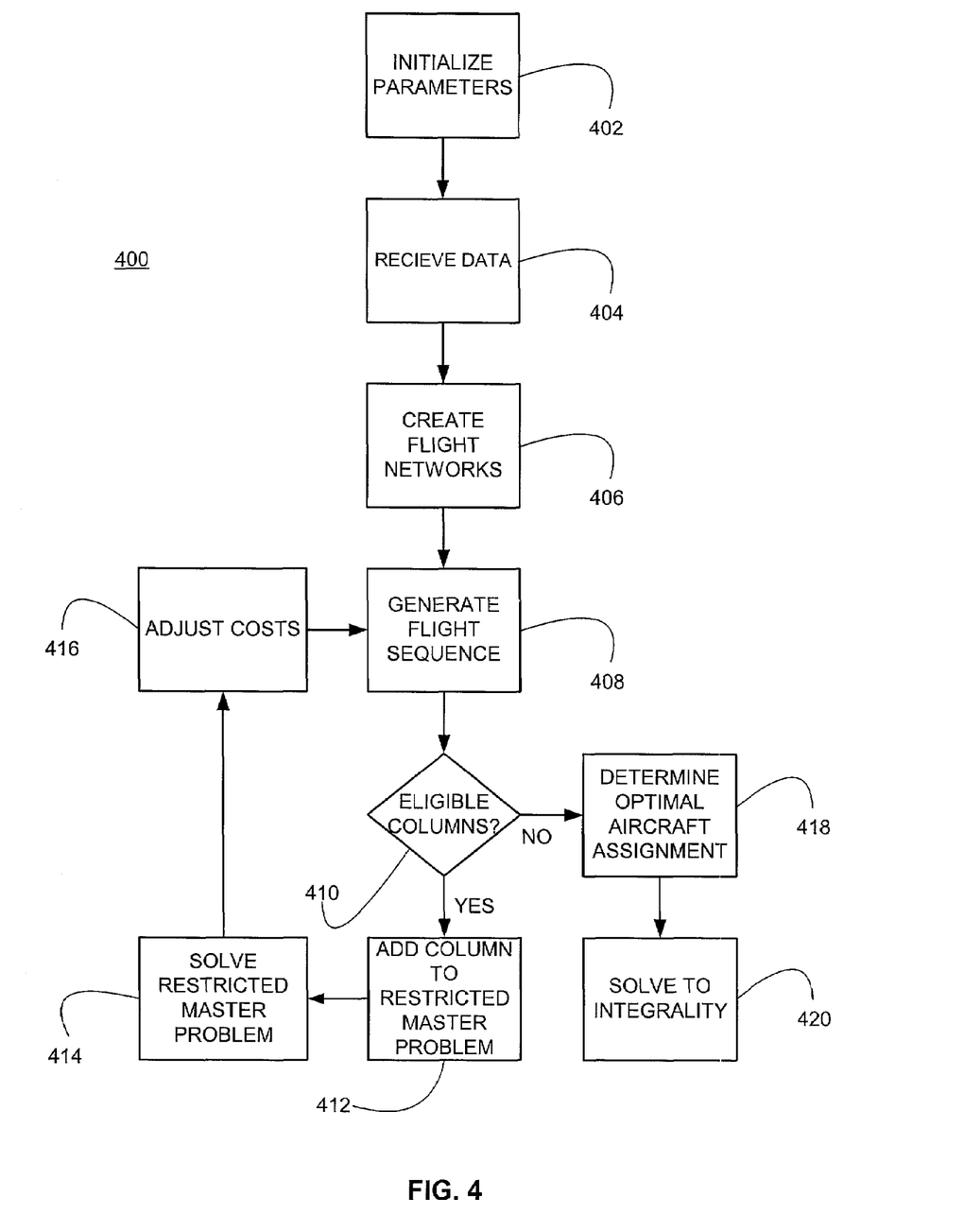
FIG. 4 illustrates an exemplary flow chart of another exemplary method, consistent with the present invention, for determining aircraft routings.

In another embodiment, features and principles of the present invention may be implemented in the exemplary flowchart 400 for routing aircraft illustrated in FIG. 4. As shown in FIG. 4, processor 106 may initialize parameters for a tree-searching algorithm (step 402). The processor 106 may receive flight, aircraft, maintenance, and/or passenger data from the flight management/operations system 102 at step 404. The processor 106 may further create specialized flight networks for each aircraft at step 406 using the received data. The processor 106 may also set up a restricted master problem at step 406. The processor 106 may solve the initial restricted master problem to determine multipliers (i.e., dual variables) using the revised simplex method.

Based on the initial solution, the processor 106 may generate a flight sequence for each aircraft fleet from the flight network using a tree-searching algorithm at step 408. Subsequently, the processor 106 may determine whether eligible columns exist for addition to the master problem at step 410. If eligible columns exist, the processor 106 may determine the column corresponding to each variable in the restricted master problem for the flight sequence and may add the column to the restricted master problem (step 412). Using the revised simplex method, the processor 106 may determine aircraft-flight sequence assignments that will meet a decision criterion by solving the restricted master problem (step 414). The processor 106 may use dual variables found in the revised simplex method to adjust the costs on each corresponding flight arc of the flight network at step 416. The processor 106 may generate the columns until no more eligible columns exist for addition to the restricted master problem. At this point, the processor may solve the restricted master problem to yield an optimal solution for aircraft-flight sequence assignments (step 418). The processor 106 may use the final solution as the root of a branch and bound method to solve for an integral aircraft-flight sequence assignment plan at step 420.

In the foregoing description, it should be apparent to ones of ordinary skill in the art that features and principles of the present invention may generate an flight assignment plan that can retain all scheduled departure times, swap aircraft within a given sub-fleet for a given flight, consider tail specific constraints, consider variable ranges for operating constraints in order to find feasible solutions, consider strategic flights assigned to a specific tail, incorporate all pre-assigned maintenance events, consider the number of booked passengers, and preserve pre-assigned through flights. Further it should be apparent, that the present invention has the capability to handle the ferrying of aircraft between airport stations, swap aircraft within the same equipment type and different seating capacity, swap aircraft across equipment types that share common crew ratings (adaptive aircraft assignment), and assign different aircraft types to flights such the there is no passenger spill (real-time fleet assignment). These situations would be handled by modifying the underlying sub-problem or restricted master problem to include these capabilities. In each case, the present invention might be biased to maintain existing assignments between aircraft type and flights and would consider diverging from this only if it is beneficial to the overall solution process.

Also in the foregoing description, various features are grouped together in various embodiments for purposes of streamlining the disclosure. This method of disclosure is not to be interpreted as reflecting an intention that the claimed invention requires more features than are expressly recited in each claim. Rather, as the following claims reflect, inventive aspects may lie in less than all features of a single foregoing disclosed embodiment. Thus, the following claims are hereby incorporated into this description, with each claim standing on its own as a separate embodiment of the invention.

What is claimed is:

1. An aircraft flight assignment method to be used in a computer system comprising:

generating an aircraft routing proposal based on information describing a possible flight of an aircraft;

determining a proposed pre-flight assignment for the aircraft based on the generated aircraft routing proposal and complying with the information describing the possible flight of the aircraft and a plurality of operational and maintenance constraints;

determining whether the proposed flight assignment meets a decision criterion describing requirements for aircraft routing;

if the decision criterion is unmet, optimizing the proposed flight assignment such that the proposed flight assignment meets the decision criterion;

generating a flight assignment plan for the aircraft using the proposed flight assignment that meets the decision criterion; and wherein at least one of the generating, determining, and optimizing steps is performed by a processor.

2. The method of claim 1, wherein optimizing the proposed flight assignment comprises:

generating refinement information;

generating an additional aircraft routing proposal based on the refinement information;

determining a revised flight assignment for the aircraft based on the generated aircraft routing proposal and complying with the information describing the possible flight of the aircraft; and determining whether the revised flight assignment meets the decision criterion.

3. The method of claim 2, wherein the proposed flight assignment is generated using a revised simplex algorithm and wherein the refinement information is generated from dual variables found in the revised simplex algorithm.

4. The method of claim 3, wherein the decision criterion is met when no more additional aircraft routing proposals can be determined based on the generated refinement information and complying with the information describing the possible flight of the aircraft.

5. The method of claim 1, wherein the information describing the possible flight of the aircraft includes at least one of flight information, aircraft information, and maintenance information.

6. The method of claim 5, wherein the flight information includes at least one of origin, destination, start time, end time, block time, booked passenger loads, passenger revenue/fare, assigned aircraft family type, assigned crew rating, and minimum equipment list restriction.

7. The method of claim 5, wherein the aircraft information includes at least one of tail identification, hourly operating cost, current location, ready time, remaining flight time, passenger capacity, family type, crew rating, and minimum equipment list capability.

8. The method of claim 5, wherein the maintenance information includes at least one of aircraft tail, type of check, scheduled location, start time, and end time.

9. The method of claim 1, wherein the information describing the possible flight of the aircraft is organized into a flight network for the aircraft and the aircraft routing proposal is generated using the flight network.

10. The method of claim 9, wherein the aircraft routing proposal is generated using a shortest path algorithm.

11. The method of claim 10, wherein the shortest path algorithm is a generalized permanent labeling algorithm.

12. The method of claim 10, wherein the shortest path algorithm is at least one of a generalized permanent labeling algorithm, a LP-based shortest path algorithm, a K-shortest path algorithm, and a Dijkstra algorithm.

13. The method of claim 1, wherein the proposed flight assignment is generated using a revised simplex algorithm.

14. The method of claim 1, wherein the flight assignment plan is generated using a branch and bound method.

15. An aircraft flight assignment system to be used in a computer system comprising:
   means for generating an aircraft routing proposal based on information describing a possible flight of an aircraft;
   means for determining a proposed pre-flight assignment for the aircraft based on the generated aircraft routing proposal and complying with the information describing the possible flight of the aircraft and a plurality of operational and maintenance constraints;
   means for determining whether the proposed flight assignment meets a decision criterion describing requirements for aircraft routing;
   means for optimizing the proposed flight assignment such that the proposed flight assignment meets the decision criterion if the decision criterion is unmet; and
   means for generating a flight assignment plan for the aircraft using the proposed flight assignment that meets the decision criterion.

16. The system of claim 15, wherein the means for optimizing the flight assignment comprises:
   means for generating refinement information;
   means for generating an additional aircraft routing proposal based on the refinement information;
   means for determining a revised flight assignment for the aircraft based on the generated aircraft routing proposal and complying with the information describing the possible flight of the aircraft; and
   means for determining whether the revised flight assignment meets the decision criterion.

17. The system of claim 16, wherein the proposed flight assignment is generated using a revised simplex algorithm and wherein the refinement information is generated from dual variables found in the revised simplex algorithm.

18. The system of claim 17, wherein the decision criterion is met when no more additional aircraft routing proposals can be determined based on the generated refinement information and complying with the information describing the possible flight of the aircraft.

19. The system of claim 15, wherein the information describing the possible flight of the aircraft includes at least one of flight information, aircraft information, and maintenance information.

20. The system of claim 19, wherein the flight information includes at least one of origin, destination, start time, end time, block time, booked passenger loads, passenger revenue/fare, assigned aircraft family type, assigned crew rating, and minimum equipment list restriction.

21. The system of claim 19, wherein the aircraft information includes at least one of tail identification, hourly operating cost, current location, ready time, remaining flight time, passenger capacity, family type, crew rating, and minimum equipment list capability.

22. The system of claim 19, wherein the maintenance information includes at least one of aircraft tail, type of check, scheduled location, start time, and end time.

23. The system of claim 15, wherein the information describing the possible flight of the aircraft is organized into a flight network for the aircraft and the aircraft routing proposal is generated using the flight network.

24. The system of claim 23, wherein the aircraft routing proposal is generated using a shortest path algorithm.

25. The system of claim 24, wherein the shortest path algorithm is a generalized permanent labeling algorithm.

26. The system of claim 24, wherein the shortest path algorithm is at least one of a generalized permanent labeling algorithm, a LP-based shortest path algorithm, a K-shortest path algorithm, and a Dijkstra algorithm.

27. The system of claim 15, wherein the proposed flight assignment is generated using a revised simplex algorithm.

28. The system of claim 15, wherein the flight assignment plan is generated using a branch and bound method.

29. A method to be used in a computer system for generating an aircraft routing proposal, the method comprising:
   receiving information describing a possible flight of an aircraft, wherein the information includes maintenance and operational constraints that are tail specific;
   generating a flight network for the aircraft from the received information, wherein the flight network represents a schedule for the aircraft;
   modeling at least one of the maintenance and operational constraints;
   determining an aircraft routing proposal for the aircraft that satisfies the received information; and
   wherein at least one of the receiving, generating, modeling, and determining steps is performed by a processor.

30. The method of claim 29, wherein modeling at least one of the maintenance and operational constraints includes generating a flow balance constraint for each node in the flight network.

31. The method of claim 29, wherein modeling at least one of the maintenance and operational constraints includes generating a swapping criterion constraint.

32. The method of claim 29, wherein modeling at least one of the maintenance and operational constraints includes generating a flying time constraint.

33. The method of claim 29, wherein modeling at least one of the maintenance and operational constraints includes generating a number of cycles on the aircraft before performing maintenance test constraint.

34. The method of claim 29, wherein modeling at least one of the maintenance and operational constraints includes generating a occurrence of scheduled maintenance check constraint.

35. A system to be used in a computer system for generating an aircraft routing proposal, the system comprising:

means for receiving information describing a possible flight of an aircraft, wherein the information includes maintenance and operational constraints that are tail specific;

means for generating a flight network for the aircraft from the received information, wherein the flight network represents a schedule for the aircraft;

means for modeling at least one of the maintenance and operational constraints; and means for determining an aircraft routing proposal for the aircraft that satisfies the received information.

36. The system of claim 33, wherein the modeling means generates a flow balance constraint for each node in the flight network.

37. The system of claim 33, wherein the modeling means generates a swapping criterion constraint.

38. The system of claim 33, wherein the modeling means generates a flying time constraint.

39. The system of claim 33, wherein the modeling means generates a number of cycles on the aircraft before performing maintenance test constraint.

40. The system of claim 33, wherein the modeling means generates an occurrence of scheduled maintenance check constraint.

* * * * *